UNITED STATES PATENT OFFICE.

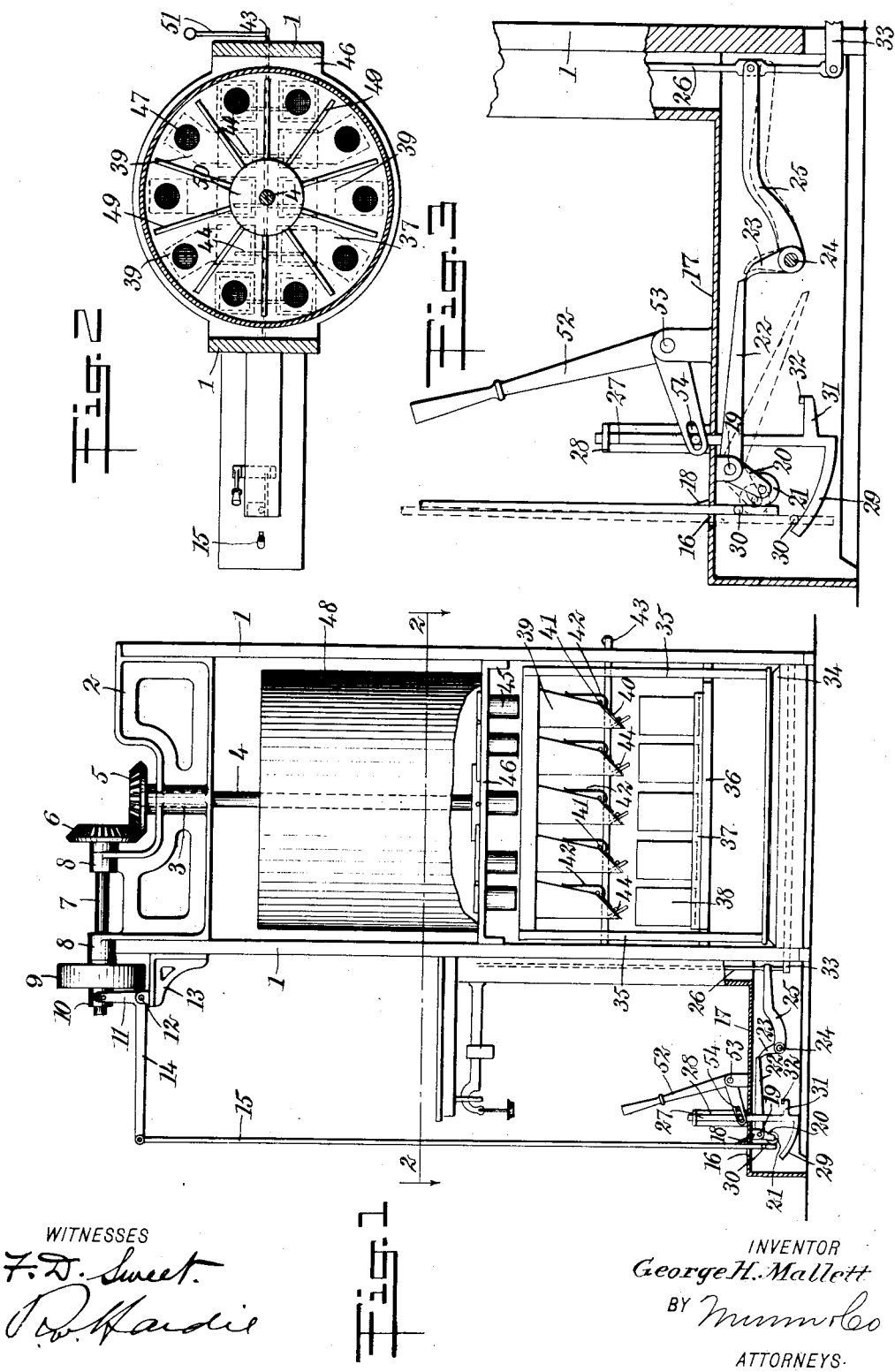

GEORGE HENRY MALLETT, OF COPAKE, NEW YORK.

WEIGHING-MACHINE.

No. 870,979.　　　　Specification of Letters Patent.　　　　Patented Nov. 12, 1907.

Application filed April 6, 1907. Serial No. 366,676.

*To all whom it may concern:*

Be it known that I, GEORGE HENRY MALLETT, a citizen of the United States, and a resident of Copake, in the county of Columbia and State of New York, have invented a new and Improved Weighing-Machine, of which the following is a full, clear, and exact description.

This invention relates to means for depositing powders or granulated commodities of various kinds in a plurality of receptacles at the same time, and is designed to provide means for accurately weighing and placing said commodities in even proportions in each of the several receptacles.

Other objects relating to the specific construction and special arrangement of the several parts will be understood from the following description and accompanying drawings in which drawings like characters of reference indicate like parts throughout the views, and in which Figure 1 is a side elevation of a device embodying my invention provided with a hopper partly broken away; Fig. 2 is a horizontal section taken on the line 2—2 of Fig. 1; and Fig. 3 is a side elevation of the weighing mechanism shown in Fig. 1, enlarged.

As illustrated in the accompanying drawings, the main frame of the device consists of vertical standards 1 provided with cross arms 2 having a bearing 3 for a rotating shaft 4, the upper end of the shaft being provided with a beveled gear 5 which meshes with the correspondingly beveled gear 6 fixedly attached to a shaft 7 which shaft is journaled in bearings 8, and provided on its outer end with a drive wheel 9 having a clutch 10 of ordinary construction attached thereto and connected with one arm 11 of a bell crank lever pivotally mounted at 12 on a bracket 13. The other arm 14 of the bell crank lever is pivotally attached to a connecting rod 15, the lower end of which rod extends through an aperture 16 formed in a casing 17 and is provided with a lug 18 adapted to bear against the upper portion of said casing and hold the drive wheel 9 in operative relation with the drive shaft 7. A trip lever is arranged within the casing 17 and mounted upon a pivot pin 19, one arm 20 of the trip lever being provided with a caster 21 adapted to bear against the lower end of the connecting rod 15. The adjusting arm 22 of the trip lever is adapted to be supported by one arm 23 of an actuating lever pivotally mounted upon a stud 24, and provided with an arm 25 connected with a rod 26 forming part of the mechanism of a scale.
A rectifying lever 27 has a sliding engagement in bearings on a bracket 28 and the upper portion of the casing 17. The lower end of said lever is provided with oppositely disposed arms, one of which 29 is curved longitudinally and adapted to engage a stud 30 attached to the lower end of the connecting rod 15 so as to raise the upper end of said connecting rod and draw it inward,
placing the lug 18 of the connecting rod 15 on the top of the casing 17. The opposite arm 31 of said lever is preferably provided with an off-set end 32, which is adapted to bear against the arm 22 of the trip lever so as to raise said arm and seat the extremity of said arm on the end of the arm 23 of the actuating lever. The weighing mechanism is provided with an operating lever 33 pivotally connected with the rod 26 and having a connection with the platform 34 of the scale. An auxiliary frame is supported upon the platform of the scale and consists of vertical standards 35 having a transverse shelf 36 attached thereto and adapted to receive a tray 37 which holds a plurality of receptacles 38, such as cans, the open upper ends of which are arranged in line with the lower ends of a plurality of pockets 39 having their lower ends provided with trap doors 40 and hinge pins 41, by means of which the doors are secured to the pockets. Springs 42 are connected with the trap doors and the pockets so as to close said doors against the bottom of the pockets.

A reciprocating rod 43 is mounted to slide longitudinally in the uprights 35 of the auxiliary frame, and provided with laterally extending transverse arms 44 which are connected with the free ends of the doors 40 of the pockets and thereby adapted to open and close said doors in unison. The upper ends of the pockets 39 are arranged in line with chutes 45 attached at their upper ends to the base 46 of a hopper 48. The base of the hopper is attached to the uprights 1 of the main frame, and is provided with a plurality of discharging apertures covered by screens 47 and preferably arranged in a circular line, as shown in Fig. 2, while the pockets 39 are arranged in straight lines, as shown in said figure, the lower portion of the central and adjacent pockets being off-set laterally so that the upper ends of the pockets may be arranged in a circular line, while the lower ends extend in straight lines. Agitating arms 49 are attached to a hub 50 which in turn is mounted upon the shaft 4, the free ends of said arms being adapted to travel across the screened apertures 47 at the bottom of the hopper.

When the device is in use, the material to be measured is placed within the hopper 48 and the rotating shaft 4 set in operation. The agitating arms 49 agitate and stir the material at the bottom of the hopper to keep the screens of the discharge orifice clean, so as to insure an even and uniform delivery of the material from the hopper to the discharge spouts 45. From said spouts the material drops into the open ends of the pockets 39. After a predetermined amount of the material has been deposited in each of said pockets, the weight of the material causes the platform of the scale to descend, depressing the end of the actuating lever 25 and releasing the arm 23 of said lever from engagement with the free end of the trip lever 22. That end of the lever then drops of its own weight, thereby raising the arm 20 of said lever and forcing the free lower end of the moving rod 15 laterally, so as to release the lug 18 from engagement with the casing 17; in which event the connecting rod 15 drops of its own weight and carries with it the free end of the arm 14 of the bell crank lever, the adjacent arm of which lever is connected with the clutch 10, thereby releasing the clutch from the drive wheel 9 and stopping the rotation of the drive shaft 7 and the vertical shaft 4 controlled thereby. The reciprocating rod 43 is then drawn outward by means of a handle 51 attached thereto thereby opening the trap doors 41 of the pockets 39, and permitting the contents of said pockets to drop into the cans 38 arranged below said pockets. After the cans have received the contents of the pockets the tray 37 supporting these cans is removed from the shelf 36 and a tray with other cans is inserted in its place. The shaft 4 is then set in operation again by means of a bell crank lever 52 mounted on a pivot 53 and provided on its short arm with a slot 54 which engages a pin attached to the reciprocating rod 27, thereby raising said rod so as to bring the curved end of the lever 29 in engagement with the stud 30 of the lower end of the connecting rod 15. The lever 29 not only raises the connecting rod 15, but draws the free end of said rod inward so as to seat the lug 18 of the connecting rod on the casing 17. The inward movement of the free end of the connecting rod 15 depresses the arm 20 of the trip lever and raises the free end of the arm 22 of said lever so as to engage the upper surface of the arm 23 of the actuating lever. When said parts are in such position the shaft 4 again rotates and the foregoing operation is repeated.

In the construction herein shown and described I have embodied my invention in its preferred form. I do not desire, however, to be limited to such construction, as other means having similar capabilities may be employed without departing from my invention.

What I claim as new and desire to secure by Letters is:

1. The combination, with a hopper having a bottom provided with a plurality of screened discharge apertures, of a rotating shaft arranged within said hopper and provided on its lower end with agitating arms, a scale, pockets supported on said scale arranged below said apertures and provided with hinged doors, and weight-controlled mechanism adapted to stop the rotation of said shaft.

2. The combination with a hopper having a bottom provided with screened discharge apertures, of a rotating shaft arranged within said hopper and provided with agitating arms, a scale, pockets arranged below said apertures supported on said scale, and a plurality of receptacles on said scale below said pockets.

3. The combination, with a hopper having a bottom provided with screened discharge apertures, of a rotating shaft arranged within said hopper and having on its lower end a plurality of radial arms, pockets arranged below the discharge apertures of the hopper, means for closing the lower portion of said pockets, a scale, and a rack mounted on said scale and adapted to support said pockets.

4. The combination, with a hopper having a bottom provided with a plurality of screened discharge apertures, of a rotating shaft arranged within said hopper and having its lower end provided with radial arms, a plurality of pockets arranged below said discharge apertures, with their lower ends extending in parallel lines, means for opening and closing the lower portion of said pockets, a scale, and a rack mounted on said scale and supporting said pockets.

5. The combination, with a hopper having a bottom provided with a plurality of screened discharge apertures, of a rotating shaft provided on its lower end with radial arms arranged within said hopper, discharge spouts connected with said apertures, a scale, a frame mounted on said scale, pockets supported on said frame and provided with hinged doors having closing mechanism connected therewith, and a reciprocating bar provided with laterally extending arms adapted to open said doors in unison.

6. The combination, with a hopper having its bottom provided with a plurality of discharge apertures, of a rotating shaft provided on its lower end with radial arms arranged within said hopper pockets arranged below said apertures, a scale, a frame mounted on said scale, supporting said pockets, and provided with a shelf arranged below the lower portion of said pockets and adapted to support a plurality of vessels, and weight-controlled mechanism connected with said scale adapted to stop the rotation of said shaft.

7. The combination, with a hopper having a bottom provided with a plurality of screened discharge apertures, of a rotating shaft arranged within said hopper and provided on its lower end with radial arms, a scale, a frame mounted on said scale and provided with a shelf adapted to support a tray with a plurality of receptacles, pockets mounted on said frame below said discharge apertures, provided with inclined doors hinged to the lower portion of said pockets and with springs adapted to close said doors, and a reciprocating bar provided with laterally extending arms adapted to open the doors of said pockets in unison.

8. In a machine of the character described, the combination of a hopper having a bottom provided with a plurality of screened apertures, a rotating shaft arranged within said hopper and provided on its lower end with radial arms discharge spouts connected with said apertures, pockets operatively connected with said discharge spouts, a scale, a frame mounted on said scale supporting said pockets, a pivoted actuating lever connected with said scale, a trip lever connected with said actuating lever, clutch mechanism connected with said trip lever, and a drive shaft connected with the clutch mechanism.

9. The combination of a hopper having its bottom provided with a plurality of screened discharge apertures, a rotating shaft arranged within said hopper and provided on its lower end with radial arms, a plurality of pockets arranged below said discharge apertures, a scale, a frame mounted on said scale and supporting said pockets, a drive shaft connected with the first-named shaft and provided with a clutch, and weight-controlled mechanism connected with said clutch and scale.

10. The combination of a hopper having a bottom provided with screened discharge apertures, a rotating shaft arranged within said hopper and provided on its lower end with radial arms adapted to bear against the bottom of said hopper, pockets arranged below the discharge orifices, a scale, a frame mounted on the platform of said scale and supporting said pockets, an actuating lever connecting with said scale, a trip lever connecting with said actuating lever, a rod, a drive shaft connected with said first-named shaft and provided with a clutch, a connecting rod pivotally connected with said clutch and trip lever, and a rectifying lever arranged in operative relation with said connecting rod and trip lever.

11. The combination of a hopper having its bottom provided with a plurality of screened discharge apertures, a rotating shaft arranged within said hopper and provided on its lower end with radial arms pockets arranged below said discharge apertures, a scale, a frame mounted on said scale and supporting said pockets, a pivoted actuating lever connected with said scale, a bell crank trip lever connected with the actuating lever, a drive shaft having clutch mechanism connected therewith, a connecting rod pivotally attached to a lever of the clutch mechanism having its lower end extending through a casing and provided with a supporting lug, and a rectifying lever adapted to lift said connecting rod and one of the arms of said trip lever.

In testimony whereof I have signed my name to this specification in the presence of two subscribing witnesses.

GEORGE HENRY MALLETT.

Witnesses:
JOHN G. PULEN,
FRANK WILCOX.